United States Patent [19]

Danker

[11] Patent Number: 4,605,524

[45] Date of Patent: Aug. 12, 1986

[54] METHOD AND MASTER-DIE FOR CASTING A BIFOCAL CONTACT LENS IN A SINGLE PIECE

[75] Inventor: Frederick J. Danker, Boonton, N.J.

[73] Assignee: Danker Laboratories, Inc., Sarasota, Fla.

[21] Appl. No.: 672,840

[22] Filed: Nov. 19, 1984

[51] Int. Cl.⁴ .............................................. B29D 11/00
[52] U.S. Cl. ................................. 264/2.5; 249/135; 249/184; 249/187 R; 264/219; 425/808
[58] Field of Search ................ 264/1.8, 2.5, 219; 29/447; 425/808; 249/135, 175, 184, 187 R

[56] References Cited

U.S. PATENT DOCUMENTS

| | | |
|---|---|---|
| 285,058 | 9/1883 | Nickerson ........................ 249/135 |
| 2,254,440 | 9/1941 | Moulton .......................... 264/1.8 |
| 2,424,235 | 7/1947 | Hoffer ............................ 425/808 |
| 3,579,805 | 5/1971 | Kast ............................... 29/447 |
| 3,649,236 | 3/1972 | Rosenbauer ..................... 264/2.5 |
| 3,946,982 | 3/1976 | Calkins et al. .................. 425/808 |
| 4,025,751 | 5/1977 | Wright ............................ 29/447 |
| 4,169,119 | 9/1979 | Covington ....................... 264/2.5 |
| 4,190,621 | 2/1980 | Greshes .......................... 264/1.8 |
| 4,279,401 | 7/1981 | Ramirez .......................... 264/1.8 |
| 4,425,699 | 1/1984 | Nordin ............................ 29/447 |

Primary Examiner—James Lowe
Attorney, Agent, or Firm—Frishauf, Holtz, Goodman & Woodward

[57] ABSTRACT

A bifocal contact lens has a distant-vision portion of a diameter between 3 and 5 mm either located in the center of the lens or offset about 2 mm above the center. The anterior surface of the lens is cast in an injection molding machine from a working die which itself is made from a master-die composed of two pieces of steel, a plug portion being tightly fitted in an aperture in the carrier portion so that the boundary of the different prescription curvatures of the plug and carrier portion will meet as closely as possible. The plug portion is shrink-fit inside the carrier portion. No further finishing procedures are necessary after casting the bifocal lens in one piece from the working dies, and the working dies are so cheap to cast that they may be melted down after one or a few uses to make new working dies from the steel master-dies.

11 Claims, 8 Drawing Figures

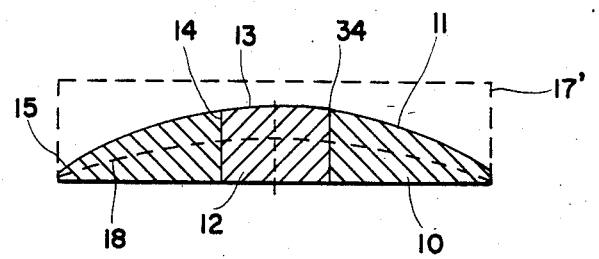
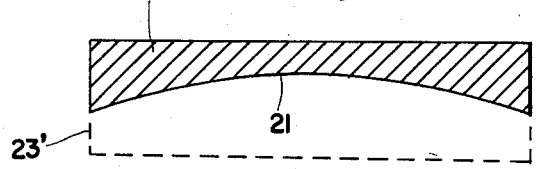
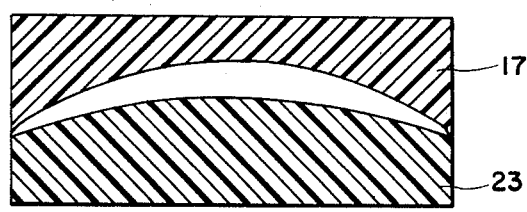
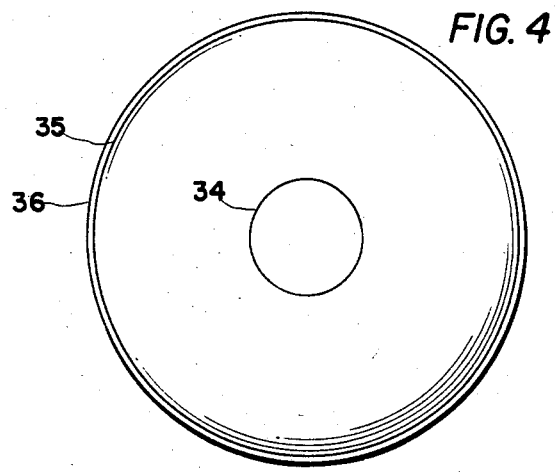

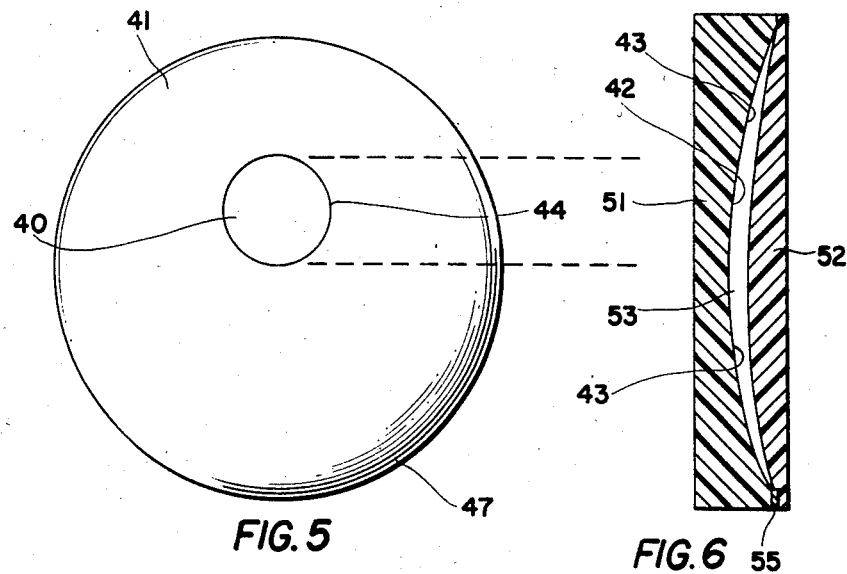
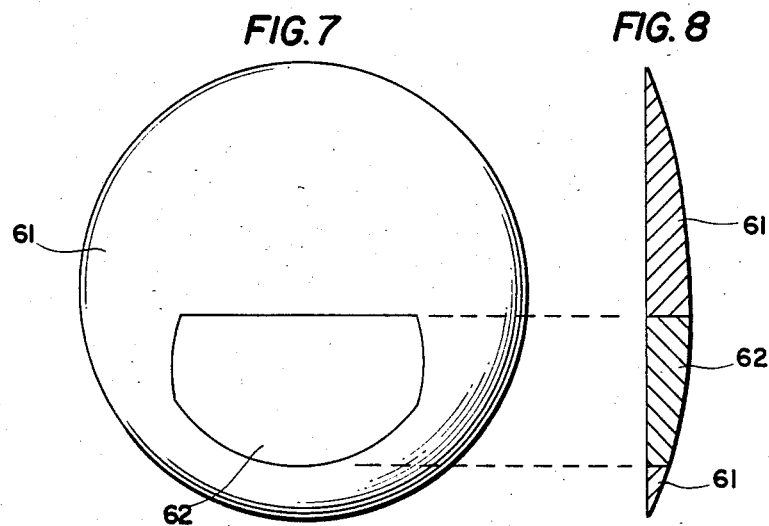

METHOD AND MASTER-DIE FOR CASTING A BIFOCAL CONTACT LENS IN A SINGLE PIECE

This invention concerns a method of casting a bifocal contact lens in a single piece and a master-die and method of making the same for use in the casting process. The casting process depends for its practicality and economy on the master-die of the invention and the method of making the master die is therefore a significant part of the method of the invention for integrally casting a bifocal contact lens.

BACKGROUND AND PRIOR ART

Bifocal contact lenses have heretofore been made by introducing into a lens blank made of one clear plastic material, some bodies of another clear plastic material having a different index of refraction for certain parts of the lens blank and then fusing the materials together at the boundary by heat. Such a method is illustrated in U.S. Pat. No. 3,697,629, in which a lens blank is first made and then the blank is finished into a contact lens by cutting and polishing to the desired curvature. Several methods of inserting the material of different index of refraction are described.

In the case of any bifocal occular aid, the lens remains in the same position with respect to the user's head, and the eyeball turns to shift the angle of view so as to look through a different portion of the lens. In the case of a contact lens, the same angular rotation of the eyeball, of course, makes a very much smaller shift of the area of the lens that is used. It is still necessary for the eyeball to move relative to the lens, which means there is a slight movement of the cornea along the surface of the lens. If the bifocal lens is not symmetrical about the center of the lens, it then becomes necessary to prevent the lens from rotating about its own axis in the course of blinking action of the eyes. It has been found that the lens stays quite well centered on the pupil of the eye, but that some rotation may occur while the lens appears to remain properly in place.

SUMMARY OF THE INVENTION

It is an object of the present invention to find a way of molding bifocal contact lenses in one piece of the same material in which the bifocal feature is provided by areas of different curvature of the anterior surface of the lens. The posterior surface of the lens must of course fit the cornea of the wearer. It is another object of the invention to provide a one-piece casting method for bifocal contact lenses which will avoid the expense of finishing stages after casting and of introducing the region of a different material into a part of the lens and, in particular, to provide a casting method that results in the lens as cast having the necessary optically smooth surfaces.

It is a further object of the invention to provide, in the case of bifocal contact lenses which are not symmetrical about the center of the lens, with some feature that will result in the lens remaining in its proper rotational orientation while it is worn, regardless of the kind of rotational forces acting on the lens as the result of the wearer's particular kind of blinking action.

The method of the invention is briefly as follows. Metallic master dies, preferably made of steel, are machined to the curved surfaces necessary for the lens in a manner presently to be described further. From these metallic master-dies plastic casting dies are made and these are used in an injection molding machine to cast the contact lens. These plastic dies produce optically smooth surfaces on the cast lenses, but are so cheap that they can be discarded and replaced after each use to assure the necessary optical quality of the cast contact lenses, the discarded plastic dies being then recycled after one use (or a small number of uses) as scrap material from which new plastic dies can be cast by means of the master-dies.

Because the master-dies are used to make working dies, their surfaces correspond exactly to those of the finished lens, rather than to the inverse of the surfaces of the finished lens. The convex master die will accordingly produce the working die for the anterior surface of the lens. It is accordingly made of two parts to provide the regions of different curvature necessary for a bifocal lens. It has been found preferable for the distant vision portion of the lens to be constituted by a lens portion that is surrounded by the rest of the lens, the surrounding portion having a curvature appropriate for near vision, as for reading. The distant vision portion in one embodiment is in a central circular portion, but other embodiments are also useful in which the distant vision portion is off-center and/or has a contour other than circular.

The master-die for the anterior surface of the lens accordingly has an insert or plug of steel having a precisely polished curved surface corresponding to the distant vision prescription. This is inserted in a closely-fitting aperture or bore passing through the other portion of the master-die, which may be referred to as the carrier, and which has a curved surface corresponding to the prescription for near vision. Precision machining is generally necessary for the surfaces of the carrier and of the plug which fit together, as well as for the curved surfaces corresponding to the respective prescriptions. The carrier and the plug must then be carefully and precisely fitted together, so that their respective curved surfaces will meet at the joint between the two as precisely as possible, and this fit must be performed in such a way that the two parts can be shrunk together firmly (i.e., the carrier must be hotter at the time the two pieces are fitted together precisely, so that when it cools thermal contraction will tighten the joint, and the machining of the lateral surfaces of the plug and of the rolls of the aperture must take account of the shrink in the usual way).

The casting of the working dies from the master-dies leaves little trace of the joint, and the lenses cast from the working dies, although upon close examination they reveal a slight trace of the joint in the master-die, that feature of the lens has no significant effect upon the quality of vision. No further finishing is necessary either there or on any other part of the optical surfaces.

The curvature of the master-die for the anterior surface is also increased slightly at the rim of the lens to provide a suitable edge profile.

A preferred embodiment of bifocal contact lens according to the invention is a lens that is symmetrical about its central axis and requires no modification to keep it from rotating about its axis as the result of blinking motion. In this preferred embodiment, the distance vision portion of the lens is in the center and has a circular contour of a diameter of about 3 to 5 millimeters. The remainder of the lens is of a curvature for near vision. In another embodiment according to the invention, the distant vision region of the lens is again circular and of a diameter of 3 to 5 millimeters, but instead of being centered on the center of the lens, its center is about 2 millimeters directly above the center of the lens. In order to assure maintenance of the rotational position of the lens on the cornea, the lens is made with a slight additional prismatic shape so that it is very slightly thicker at the bottom than at the top, so that by gravity the heavier bottom portion will tend to remain in position. The method according to the invention of making such an embodiment then includes the additional procedure of inserting a shim between the working molds and casting the lens so that the molds are slightly separated at the portion of the edge of the lens to be cast, which is to be the bottom of the lens as worn. This system enables the lens molds to be made with spherical curvatures about the usual axes, while still permitting the prismatic supplement to be provided.

The method of the invention is also usable for making bifocal lenses of the conventional type in which the near vision portion is an "island" in the lens, usually offset downward and slightly towards the nose, and the remainder of the lens is of the curvature required for distant vision. In fact, the method of one-piece casting of bifocal lenses used in accordance with the present invention for casting contact lenses is also usable for casting spectacle lenses in one piece.

BRIEF DESCRIPTION OF THE DRAWINGS

The invention is further described by way of illustrative examples with reference to the annexed drawings, in which:

FIG. 1 is a cross-section of a master-die for the anterior surface of a bifocal contact lens in accordance with the invention;

FIG. 2 is a cross-section of a master-die for the posterior surface of a contact lens which is to have the anterior surface curvature provided by the master-die of FIG. 1;

FIG. 3 is a cross-section of a working die made from the master-die of FIG. 1 positioned in registry upon a working die made from the master-die of FIG. 2 for casting a bifocal contact lens in accordance with the invention;

FIG. 4 is a top view of the master-die of oil-hardened, rod steel shown in cross-section in FIG. 1;

FIG. 5 is a top view of a second embodiment of a master-die for the anterior surface of a contact lens to be manufactured in accordance with the invention;

FIG. 6 is a cross-section, in a plane corresponding to the vertical cross-section of the lens to be made, of a working die corresponding to the master-die of FIG. 5 placed in registry with a working die for the posterior surface of the lens to be made, with the interposition of a shim at the bottom to produce a slight prismatic effect for the purpose of making the lens slightly heavier at the bottom so that it remains upright during wearing of the lens;

FIG. 7 is a top view of a third embodiment of a master-die for the anterior surface of a contact lens to be made in accordance with the invention, and FIG. 8 is a cross-section of the master-die of FIG. 7 in a plane corresponding to the vertical cross-section plane of the lens to be made therefrom.

DESCRIPTION OF THE PREFERRED METHODS AND DIES

FIG. 1 is a cross-section of a steel master-die for the anterior (front) surface of a one-piece bifocal contact lens. A top view of the master-die of FIG. 1 is shown in FIG. 4. It is made of two parts, 10 and 12, that are preferably of the same kind of steel, which should be a steel selected for its capability of being machined and polished to provide a surface of high optical smoothness, for example. The larger of the two parts is what may for convenience be called the carrier 10, which has a convex spherical top surface 11 that corresponds to the near vision prescription for a lens which is to be manufactured and also a edge portion 15 which is rounded off downwards for appropriate shaping of the rim portion of the lens to be made. The bottom surface is shown flat, which is convenient for placing the master-die in an injection molding machine for making working dies therefrom. To simplify the drawing, no features of the die have been shown which may be necessary for fastening the master-die in an injection molding machine for making the working dies. Such fastening is conventional and well-known. Broken lines 17 show the cross-sectional shape of a working die to be made from the master-die.

The second part 12 of the master-die shown in FIG. 1 is an insert or plug tightly fitted within the carrier 10. Its top surface is machined and polished to a spherical curved surface 13 corresponding to the distant vision prescription for the lens to be manufactured with working dies made from the illustrated master-die. The curved surface 13 is fitted accurately at its joint 34 with the curved surface 11. The bottom flat surface of the plug 12 does not need to fit accurately with the bottom flat surface of the carrier 10, but it ought never to protrude below the bottom surface of the carrier 10. The plug 12 is firmly joined to the carrier 10 by a shrink-fit. If both pieces are made of the same material, this means that the carrier 10 must be hotter when the two parts are fitted together, so that when the carrier 10 cools, it will tightly grasp the plug 12 and prevent the accurate fit of the parts from being disturbed in later use of the master-die.

The accuracy of the fit of the plug in the carrier 10 may, for example, be assured by interferometric observation of the surfaces 13 and 11 as they are put together while the carrier 10 and the plug 12 are relatively adjusted by a micrometer drive to which they are attached by their bottom surfaces through means not shown in the drawing.

When not only the curved surfaces 11 and 13 are accurately machined and polished, but the intersurface fit together at the joint 14, 34 is likewise precisely made, no further polishing or finishing of the convex surface of the master-die of FIG. 1 is necessary after the plug 12 has been shrink-fitted into the carrier 10.

Another master-die is of course needed for the posterior surface of the lens to be made. This is illustrated in FIG. 2. It is shown with its concave spherical surface 21 facing downwards to make clear that that surface corresponds to the concave surface of the lens to be made which must fit over the cornea of the wearer of the lens. The surface 21 is normally also a precisely machined and polished surface and the die 20 is typically made of the same kind of steel as the master-die shown in FIG. 1. The broken lines 23' show, in cooperation with the curved line 21, the cross-sectional shape of a working die 23 (FIG. 3) that may be made from the master-die 20, just as the broken line 17' in FIG. 1 shows how the working die 17 (FIG. 3) is made from the master die 10, 12. The curvature 21 of the die 20 is indicated by a broken line 18 on FIG. 1 for purposes of comparison.

The working dies 17 and 23 shown in cross-section in FIG. 3 correspond to those outlined in broken lines in FIGS. 1 and 2 and are therefore designated by the same reference numerals. The dies 17 and 23 are shown in registry as they might be fitted together in an injection molding machine (without showing the means for fastening these dies to the parts of the machine or any other details of how the dies are used in the machine, since that is well-known, is not part of the present invention, and therefore does not require any description here).

The empty space shown between the working dies 17 and 23 shown in FIG. 3 of course shows the cross-section of the lens that can be cast by the use of those working dies in an injection casting machine. The reduced curvature in the central portion of the working die 17 of course produces the bifocal effect. It is difficult to discern this difference of curvature in FIG. 3, although it is actually there just as much as in FIG. 1.

FIG. 4 which shows a top view of the master-die of FIG. 1 can also represent a top view of the lens to be made with the working dies 17 and 23, except that on the lens the boundary 34 is practically invisible. The boundary 35 is likewise not visible since that just merely indicates the beginning of the rounding-off that is necessary at the outer edge of the lens, which terminates in the boundary 36, in order to provide an edge shape that is easier to manipulate and comfortable for the wearer of the contact lens.

FIG. 5 corresponds to FIG. 4 and shows in top view a second embodiment of master-die of the invention, of which FIG. 6 shows a cross-section. FIG. 5, like FIG. 4, also corresponds to a top view of the lens that can be indirectly made from the master-die, but in this case some portion of the boundary 44 may be more visible than the boundary 34 in the case of a lens corresponding to FIG. 4, because the fitting together of the different spherical curvatures of the surfaces 42 and 43 may be impossible to accomplish perfectly at all points of these boundaries and the best possible fit will then result in a slight step-down from the surface 43 to the surface 42 at some places and in a slight step-up in other places. It has been found that such a boundary does not appreciably affect the quality of vision through the lens. The curvature transition for the periphery of the lens is only partly shown in this case by the line 47.

FIG. 5 shows that the location of the plug 40 in the carrier 41 does not need to be central. The configuration of FIG. 5 shows making the distant vision portion offset slightly upwards from the center. The offset is preferably about 2 mm.

FIG. 6 illustrates a way of making lenses corresponding to the master-die of FIG. 5 where the distant vision portion of the lens is offset from the center, and it is accordingly desired that the lens should not rotate while it is worn and thus displace the distant vision region. In FIG. 6 there are shown two working dies fitted together, the die 51 and the die 52 which, like the die 23 of FIG. 3, fits the curvature of the cornea of the wearer of the lens. The portion 53 corresponding to the distant vision region 43 of the master-die of FIG. 5 is shown flat in FIG. 6 so that it can readily be distinguished.

FIG. 6 shows the working dies 51 and 52 fitted in registry with the interposition of a shim 65 separating the dies 51 and 52 slightly at the bottom or, rather, at the portion of the periphery of the die curvatures which corresponds to the bottom of the lens that is to be cast, when it is worn by the purchaser. The shim 55 can extend partway around the lower portion of the periphery of the joint between the dies 51 and 52, in which case of course it should be tapered down from a maximum thickness at the center of the bottom of the lens to be made. When the dies 51 and 52 are placed in an injection casting machine with a shim 55 fastened to one or the other of them, the part of the lens that will be at the bottom when it is worn will be slightly thicker, which is to say that there is a slight prismatic character added to the lens that has a negligible effect optically but makes the bottom part of the lens heavier, so that by gravity it will stay in place rather than rotate under the influence of blinking or other disturbances. In order to accomodate the shim 55, the dies 51 and 52 extend beyond the rim of the lens to be cast, fitting closely at the top and permitting a shim 55 to be inserted at the bottom without interfering with the portions of the dies that determine the curved surfaces of the lens. Oil-hardened, rod steel is used for all parts of this die assembly.

FIG. 7 illustrates a master-die (oil-hardened rod steel) for making a lens in which the near vision portion is an island in the lens and is offset from the center of the lens downwards and slightly towards the nose. FIG. 7 also shows that the contour of the plug in the carrier of the master-die does not need to be circular, although of course it may then be somewhat more difficult to shape precisely the aperture the carrier 61 into which the plug 62 must fit. Machining methods are available today, however, for making such apertures without great difficulty in steel dies, even without resort to electrical-erosion machining (EDM and ECM), which is also available for making apertures of complicated shape. Thus, oval or rectangular lens regions for near vision could be provided, for example, if desired.

FIG. 8 is a cross-section of the master-die shown in FIG. 7. As in the case of FIG. 4, FIG. 7 can also be regarded as a front view of the lens to be cast, although in the illustrated case it also shows a view of the master-die.

The method above described for casting bifocal lenses in one piece can be applied to any plastic lenses of materials known at the present time, i.e., hema, silicone acrylate, polymethylmethacrylates, carbon plastics, butyls, polyvinyls and many other materials. The working dies used for casting the plastic lenses can likewise use a wide variety of materials, for example polypropylene, polymethylmethacrylate, a material available under the trademark designation "ultem", and other moldable types of plastic which are stable at the casting temperatures of the plastic lens material. At the present time silicone, P.M.M.A. silicone/acrylate copolymers are preferred for the lens material and Ultem, P.M.M.A. or polypropylene are preferred for the working die material.

With some materials it may be necessary to use a coating for release of the lens from the working dies, which can be applied rapidly by machine as the dies are made, if desired. Such a release coating can typically be Vydax #525 Fluorotelome.

The preferred configuration for a bifocal lens is the configuration of FIG. 4, which corresponds to the die of FIG. 1, with the center serving for distant vision and having a diameter between 3 mm and 4 mm, while the balance of the lens is used for near vision. The overall diameter of the lens preferably is about 14 mm. The invention also lends itself to unusual configurations, such as may be needed for upwardly directed near vision, as in the case of a mechanic working underneath an automobile. It will therefore be seen that although the invention has been described with reference to particular illustrative embodiments, variations and modifications are possible within the inventive concept.

I claim:

1. Method of casting in one piece a bifocal contact lens for improving the vision of a living eye, comprising the steps of:

providing a carrier portion of a first metal master-die with a convex surface of a first value of radius of curvature surrounded by a narrow rounded-off rim portion of small radius of curvature, said first value of radius of curvature being of a magnitude for correction of near vision for a living eye by a contact lens;

providing a plug insert portion of said first metal master-die with a convex surface of a second value of radius of curvature, said second value of radius of curvature being of a magnitude for correction of distant vision for a living eye by a contact lens, said second radius of curvature being greater than first radius curvature;

cutting an aperture in said carrier portion of a shape and size suitable for a shrink-fit of said plug insert portion in said carrier portion;

inserting and shrink-fit securing said plug insert portion in said carrier portion of said first master-die with adjustment of said plug insert portion in said aperture to optimise the fit of said convex surfaces to each other before shrink-fit securing;

providing a second metal master-die having a concave curved surface of a third value of, radius of curvature differing from at least one of said first and second values or radius of curvature, said third value of radius of curvature being of a magnitude for fitting the cornea of a living eye by the posterior surface of a contact lens;

making first and second working dies respectively from said first and second master-dies, and casting, between said first and second working dies, a lens, of a transparent synthetic polymeric material which is sufficiently thin to be usable as a contact lens for a living eye.

2. Method according to claim 1, in which said aperture made in said carrier portion of said first master-die is centrally located in said carrier portion.

3. Method according to claim 1, in which said aperture in said carrier portion of said first master-die is offset by about 2 mm from the center of said carrier portion.

4. Method according to claim 2, in which said plug insert portion of said first master-die is of circular cylindrical contour and has a diameter of not less than 3 mm and not more than 4 mm, and in which said aperture in said carrier portion of said first master-die is cylindrical.

5. Method according to claim 3, in which said plug insert portion of said first master-die is of circular cylindrical contour and has a diameter of not less than 3 mm and not more than 4 mm, and in which said aperture in said carrier portion of said first master-die is cylindrical.

6. Method according to claim 4, in which the step of casting a lens between said first and second working dies is performed with the insertion of a separating shim in the region of said first and second master-dies near the edge portions thereof on the side of the center of the lens opposite to the direction corresponding to the offset of said aperture of said carrier portion of said first master-die from the center of said carrier portion, thereby providing a slight optically prismatic thickening of the lens towards the part that is to be worn downwards by the user of the lens.

7. A master-die for making working dies usable in the manufacture of one-piece cast bifocal lenses for vision-improving use, comprising:

a carrier portion of a metal capable of having its surfaces ground and polished to an optical smoothness, said carrier portion having a convex surface on one side thereof which has a first value of radius of curvature and is surrounded by a narrow rounded-off rim portion of small radius of curvature, said carrier portion having an aperture therethrough, and a plug insert portion of a metal capable of being ground and polished to an optically smooth surface and having a convex surface of a second value of radius of curvature which is greater than said first value of radius of curvature, said plug insert portion being tightly fitted in said aperture in said carrier portion in such a way that said convex surface of a second value of radius of curvature fits substantially as closely as possible to said convex surface of a first value of radius of curvature of said carrier portion.

8. A master-die according to claim 7, in which the contour of said plug portion is circular and cylindrical, and in which said aperture is cylindrical.

9. A master-die according to claim 8, in which said aperture is centered in said carrier portion and is of a diameter not less than 3 mm and not greater than 4 mm, and in which said plug portion likewise has a diameter not substantially less than 3 mm nor substantially greater than 4 mm.

10. A master-die according to claim 8, in which said aperture is off-set from the center of said carrier portion by approximately 2 mm, and in which the contour of said plug insert portion is circular, of a diameter not substantially less than 3 mm nor substantially more than 4 mm, and in which said aperture is cylindrical and of a diameter not substantially less than 3 mm nor substantially more than 4 mm.

11. A master-die according to claim 7, in which both said carrier portion and said plug insert portion thereof are made of steel.

* * * * *

UNITED STATES PATENT AND TRADEMARK OFFICE
CERTIFICATE OF CORRECTION

PATENT NO. : 4,605,524
DATED : August 12, 1986
INVENTOR(S) : DANKER

It is certified that error appears in the above-identified patent and that said Letters Patent is hereby corrected as shown below:

Column 8, line 4, Claim 6 should be dependent on

Claim 3.

Signed and Sealed this

Tenth Day of February, 1987

*Attest:*

DONALD J. QUIGG

*Attesting Officer*    *Commissioner of Patents and Trademarks*